(12) United States Patent
Jancok

(10) Patent No.: US 9,809,768 B2
(45) Date of Patent: Nov. 7, 2017

(54) DEVICE FOR THE PRODUCTION OF FUEL GAS FROM MATERIALS OF ORGANIC AND/OR INORGANIC ORIGIN

(71) Applicant: Lubor Jancok, Rasun Anterselva (IT)

(72) Inventor: Lubor Jancok, Rasun Anterselva (IT)

(*) Notice: Subject to any disclaimer, the term of this patent is extended or adjusted under 35 U.S.C. 154(b) by 100 days.

(21) Appl. No.: 14/959,126

(22) Filed: Dec. 4, 2015

(65) Prior Publication Data

US 2017/0158975 A1   Jun. 8, 2017

(51) Int. Cl.
| | |
|---|---|
| *C10J 3/20* | (2006.01) |
| *C10J 3/32* | (2006.01) |
| *C10B 53/02* | (2006.01) |
| *F02M 31/18* | (2006.01) |

(52) U.S. Cl.
CPC . *C10J 3/20* (2013.01); *C10J 3/32* (2013.01); *F02M 31/18* (2013.01); *C10J 2300/0916* (2013.01); *C10J 2300/0973* (2013.01); *C10J 2300/0976* (2013.01); *C10J 2300/1276* (2013.01); *C10J 2300/1671* (2013.01); *C10J 2300/1853* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,463,379 A | * | 7/1923 | Strandlund | A01B 63/18 |
| | | | | 172/402 |
| 1,467,758 A | * | 9/1923 | Day | C10G 9/02 |
| | | | | 201/2 |
| 1,884,379 A | * | 10/1932 | Tenney | C10B 7/10 |
| | | | | 202/118 |
| 2,357,621 A | * | 9/1944 | Tuttle | C10B 55/00 |
| | | | | 202/118 |
| 2,398,446 A | * | 4/1946 | Phillipson | C10B 7/10 |
| | | | | 202/118 |
| 5,151,159 A | * | 9/1992 | Wolfe | C10B 7/10 |
| | | | | 201/8 |
| 5,235,676 A | * | 8/1993 | Clay | B65H 31/08 |
| | | | | 358/1.14 |
| 5,417,492 A | * | 5/1995 | Christian | B01F 15/068 |
| | | | | 219/388 |

(Continued)

FOREIGN PATENT DOCUMENTS

| | | |
|---|---|---|
| EP | 1 865 045 | 3/2012 |
| JP | 2001-289422 | 10/2001 |

*Primary Examiner* — Kaity Chandler
(74) *Attorney, Agent, or Firm* — Jacobson Holman, PLLC.

(57) ABSTRACT

A device for producing fuel gas from materials of organic and/or inorganic origin, comprising filling chamber connected to at least one supply auger conveyor for supplying material from the filling chamber into a reactor comprising at least two heated gasification augers. The invention consists in the fact that each horizontal row of gasification augers is formed by a gasification body, the casing of which has a closed oval cross-section formed by an upper base, a lower base, and convex side walls each with circular arc profiles, wherein each gasifying body contains at least two gasification augers arranged side by side and mutually partially separated by longitudinal partitions that form half-grooves for gasifying augers. The device is provided with at least one electrical heater. The filling chamber is hermetically sealed.

10 Claims, 5 Drawing Sheets

(56) References Cited

U.S. PATENT DOCUMENTS

| | | | | |
|---|---|---|---|---|
| 5,442,995 A * | 8/1995 | Greer | ............... | A23N 17/004 |
| | | | | 99/487 |
| 6,367,395 B1 * | 4/2002 | Masek | ............... | C05F 3/00 |
| | | | | 110/345 |
| 8,888,874 B1 * | 11/2014 | Borchert | ............... | C10B 47/44 |
| | | | | 48/61 |
| 9,045,963 B2 * | 6/2015 | Shkurti | ............... | E21B 33/1204 |
| 9,446,975 B2 * | 9/2016 | Nickerson | ............... | C10J 3/007 |
| 9,604,192 B2 * | 3/2017 | Tucker | ............... | C10B 47/44 |
| 2002/0195031 A1 * | 12/2002 | Walker | ............... | F23G 5/027 |
| | | | | 110/229 |
| 2004/0237860 A1 * | 12/2004 | Miyoshi | ............... | F23G 5/30 |
| | | | | 110/342 |
| 2007/0289205 A1 * | 12/2007 | Sparks | ............... | C10L 5/42 |
| | | | | 44/605 |
| 2010/0163395 A1 * | 7/2010 | Henrich | ............... | C10B 49/16 |
| | | | | 201/2.5 |
| 2010/0181205 A1 * | 7/2010 | Thpmas | ............... | B03B 9/061 |
| | | | | 205/568 |
| 2010/0289270 A1 * | 11/2010 | Behrens | ............... | C10B 47/44 |
| | | | | 290/1 A |
| 2011/0067991 A1 * | 3/2011 | Hornung | ............... | C10B 7/10 |
| | | | | 201/32 |
| 2011/0136971 A1 * | 6/2011 | Tucker | ............... | B82Y 30/00 |
| | | | | 524/587 |
| 2012/0266529 A1 * | 10/2012 | Scahill | ............... | C10B 47/44 |
| | | | | 44/436 |
| 2012/0279128 A1 * | 11/2012 | Zhang | ............... | C10J 3/007 |
| | | | | 48/61 |
| 2014/0158195 A1 * | 6/2014 | Shirokura | ............... | C08K 5/29 |
| | | | | 136/256 |
| 2014/0332363 A1 * | 11/2014 | McGolden | ............... | C10B 49/04 |
| | | | | 202/150 |
| 2015/0027039 A1 * | 1/2015 | Laskowski | ............... | C10L 5/14 |
| | | | | 44/603 |
| 2015/0362183 A1 * | 12/2015 | Bertram | ............... | F23G 5/0276 |
| | | | | 110/229 |

* cited by examiner

DEVICE FOR THE PRODUCTION OF FUEL GAS FROM MATERIALS OF ORGANIC AND/OR INORGANIC ORIGIN

BACKGROUND AND SUMMARY OF THE INVENTION

The invention relates to a device for the gasification of organic or inorganic materials such as bulk waste based on wood or other biomass, or even municipal waste, waste oil, coal, etc., which generates synthesis gas used as fuel for internal combustion engines and combustion turbines, for example those designed to drive electric generators in cogeneration units.

Hitherto known devices for the gasification of organic or predominantly organic materials such as wood waste, wood chips, straw, sludge, and various forms of biomass, including municipal and other wastes, predominantly utilize a gasification process based on combustion, partial combustion, or fluidized bed combustion of material. In these cases the material is filled from a filling hopper into auger conveyors, through which it is moved and is heated directly or indirectly during the passage through the auger conveyors, during which synthesis gas is developed from the ongoing thermochemical reaction. The synthesis gas is then used as a gaseous fuel for internal combustion engines of cogeneration units.

In these known devices, the major problem is maintaining the stability of the gasification process and achieving a standard high quality of the output synthesis gas, particularly in achieving a low tar and nitrogen content. Precise regulation of the combustion process is difficult, and a disadvantage also lies in the high emissions of ash and other pollutants. The output synthesis gas generally contains tars which are formed during the combustion of pre-dried material with a moisture content of up to 15%. Low moisture, which is a prerequisite of effective combustion, has the undesirable consequence of a high tar content which must subsequently be chemically removed by washing in order to achieve a sufficient quality of synthesis gas for its combustion in internal combustion engines.

In patent application JP 2001 28 94 22 A, the device for the gasification of material is described through its combustion. In order to prevent atmospheric air from entering the device and thus reducing the risk of ignition of the material in the hopper, part of the flue gas from the combustion chamber is filtered, cooled, and fed into the sealing mechanism which is positioned before the entry into the combustion chamber. Conversely, the combustion chamber is supplied with oxygen in order to improve the combustion of the unburnt particles. During the combustion of the material, which must have a low input relative moisture, undesirable tars are not formed but neither is a large percentage of nitrogen, so the output synthesis gas is not of a sufficient quality.

In patent EP 186 5045, biomass enters the device from the tray through a supply auger and then passes through two gasification augers. Below them is positioned a combustion auger, from which both gasification augers are heated. Small biomass particles pass through a sieve from the gasification auger into the combustion auger where they are combusted during the supply of preheated combustion air. Larger particles are returned to the gasification process. The developed synthesis gas passes through the entire device back to the beginning, where it is removed. The device according to EP 186 5045 is designed to allow for a reduction of the nitrogen content in the developed synthesis gas. Given that the gasification augers are not hermetically separated from the combustion auger, the disadvantage of the device is that part of the flue gas continuously penetrates into the gasification augers, so the nitrogen content in the exhaust gas cannot achieve the zero or negligible value optimal for achieving a high quality of developed synthesis gas. The tar content in the synthesis gas is also high, since the material passing through the gasification augers cannot have a high relative moisture due to the subsequent combustion.

The task of the invention is to provide a gasification device which would remove the disadvantages of the known devices, allow for the processing of materials with a high relative moisture, and achieve a high quality of developed synthesis gas with a minimum tar and nitrogen content. A further task is to provide a device with lower emissions, with efficient regulation of the gasification process, and with improved stability of the entire system.

This task is solved by creating a device for the production of gaseous fuel from materials of organic and/or inorganic origin according to the present invention.

The device includes a filling chamber which is connected to at least one supply auger conveyor for supplying material from the filling chamber into the gasification reactor. The gasification reactor comprises at least two heated gasification augers arranged in rows above beneath each other for a serpentine flow of the material through the reactor. Gaseous fuel is formed as a synthesis gas from the thermochemical reaction in the gasification augers and is collected at the outlet which is arranged on the lowest gasification auger.

The subject-matter of the invention lies in each horizontal row of gasification augers being formed by a gasification body whose casing has a closed oval cross-section formed by an upper base, a bottom base, and convex side walls each with a circular arc profile, wherein each gasification body contains at least two gasification augers arranged side by side and mutually partially separated by longitudinal partitions that form half-grooves for the individual gasification augers. The gasification bodies are heated by electric heating, wherein at least one electric heating element is arranged parallel to the lower base and/or to the upper base of each gasification body. The filling chamber is hermetically sealed to prevent the access of atmospheric air when the material is being filled. At least one neck leads into the filling chamber for supplying exhaust gases from the combustion of the synthesis gas in the internal combustion engine. The filling chamber is further provided with at least one neck for the removal of exhaust gases from the filling chamber. The device according to the invention allows for the production of synthesis gas with a lower tar content and almost zero nitrogen content, because the electric heater allows for the processing of materials with a higher relative moisture and with perfect regulated heating in the gasification bodies which, together with the elimination of combustion and with gas-tight closure of the filling chamber, results in an improved quality of the output gas used as fuel gas.

In a preferred embodiment of the invention, the filling auger conveyor is arranged above the uppermost gasification body and is fitted with at least one neck for the supply of water or steam, at least one neck for the supply of heat, and at least one neck for the removal of heat. The material fed into the reactor can thus be moisturized prior to its entry into the first gasification body and preheated to improve the parameters of the gasification process.

In another preferred embodiment of the invention, there is a spacer, positioned between the filling auger conveyor and the uppermost placed gasification body, that contains a moisture sensor for the material and an additional or alternative supply of water or steam for adjusting the moisture of the material. According to the measured moisture values, it is thus possible to make final adjustments to the moisture content of the material to the optimum value also in the spacer just before the material enters into the gasification body.

For ideal mixing and moisturizing of the input material, it is preferred that the filling chamber has a conical shape in its lower part, and leading into the filling chamber are the ends of two supply auger conveyors which are separated inside the filling chamber by a wedge-shaped partition. Towards the opposite ends of the filling conveyor auger are connected two spacers that lead to a joint outlet neck with a flange that is connected to the flange of the inlet neck of the uppermost gasification body.

For universal use for various kinds of organic and inorganic materials, it is preferred that the device comprises three gasification bodies arranged in horizontal rows one above the other, wherein inside each gasification body there are arranged, in parallel in a horizontal plane, four gasification augers separated by longitudinal partitions.

In a preferred constructional embodiment of the device according to the invention, the gasification bodies are horizontally separated from each other by vertical supporting partitions, wherein the electrical heaters are removably placed in gaps between the adjacent bodies and between the adjacent supporting partitions and the side partitions on the upper base of each gasification body. This embodiment allows for easier installation, and repair and replacement of the heaters or their parts. The electric heater preferably comprises a set of heating elements in the form of tubes whose axes extend perpendicularly to the axles of the gasification augers. The device is housed in a cabinet with service holes that allow for the exchange of the heating elements without the need to remove the outer casing of the reactor.

In order to uniformly form an airtight seal of the material in the filling chamber, the filling chamber is preferably provided with two oppositely arranged necks for the supply of exhaust gases, wherein these necks are interconnected through distribution piping. The exhaust gases can thus penetrate into the filling chamber uniformly from both sides. The neck for the release of exhaust gas from the filling chamber is arranged above the two supply necks.

Finally, it is advantageous that the front wall of each gasification body is provided with a common connecting flange for connecting the drives to the axles of the gasification augers in the gasification body.

The advantages of the device according to the invention are that it allows for the generation of high-quality synthesis gas with a minimum content of tars and nitrogen from various kinds of organic and inorganic materials which may have a relative moisture content greater than 50%. An advantage is also the even and intense electric heating of moist material in the gasification bodies with common and uniform heating of several gasification augers at the same time. Another advantage is the simple prevention of the inlet of atmospheric air into the gasification process using exhaust gases that are formed as combustion products of synthesis gas, in an internal combustion engine. The device, in comparison to known reactors, is characterized by low emissions, efficient regulation of the gasification process, and improved stability of the entire reactor system associated with the cogeneration unit.

DESCRIPTION OF THE DRAWINGS

The invention is described in detail by means of the drawings as follows.

EXAMPLES OF THE PREFERRED EMBODIMENT OF THE INVENTION

It should be understood that the further described and illustrated specific examples of the realized invention are presented for illustrative purposes and not as a limitation of the examples of the realization of the invention to the cases shown herein. Those skilled in the art shall find, or using routine experimentation will be able to determine, a greater or lesser number of equivalents to the specific realizations of the invention that are specifically described here. These equivalents shall also be included into the scope of the following claims.

Figure 1:
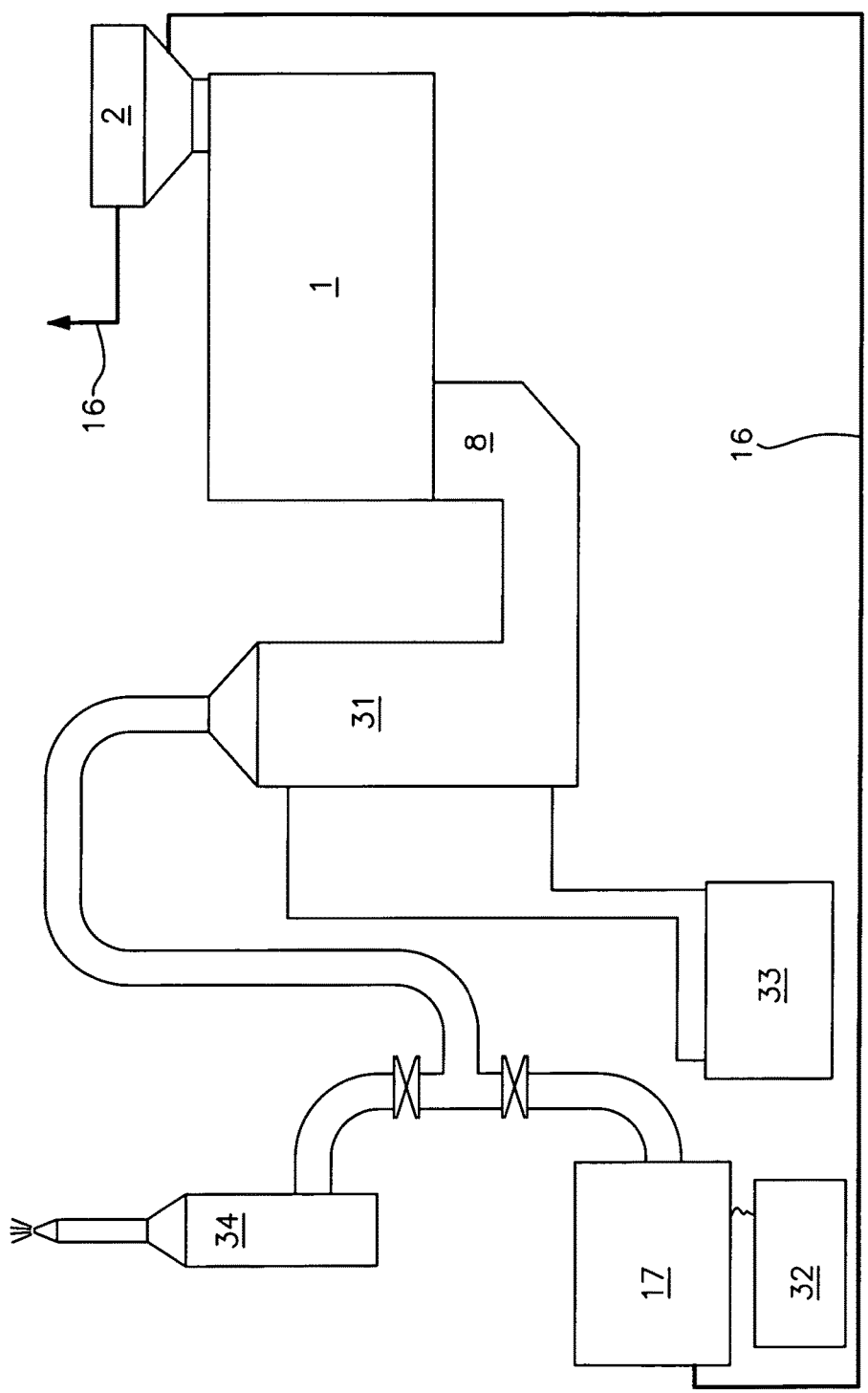
FIG. 1 is a block diagram of the device according to the invention showing the reactor connected to a cogeneration unit and other parts of the synthesis gas processing technology

The device 1 is, in the embodiment shown in FIG. 1, part of a technological system used to produce electricity from biomass. Electrical energy is produced by a generator which is part of a cogeneration unit connected to a transformer 32. The generator is powered by a combustion engine 17, which is continuously supplied by gaseous fuel produced in the device 1 as synthesis gas formed as a thermochemical reaction by the gasification of biomass. The synthesis gas is removed at the outlet 8 of the device 1, passes through a cooling and cleaning unit 31, to which is connected an auxiliary media unit 33. Prior to entering the internal combustion engine 17 a torch 34 is mounted on the pipe supplying the synthesis gas for the emergency combustion of synthesis gas in the event of failure of the internal combustion engine 17. The exhaust gases 16 from the combustion engine 17 are led to the filling chamber 2 of the device 1, and hermetically fill it, thus preventing the inlet of atmospheric air contained in the biomass to the device 1.

Figure 2:
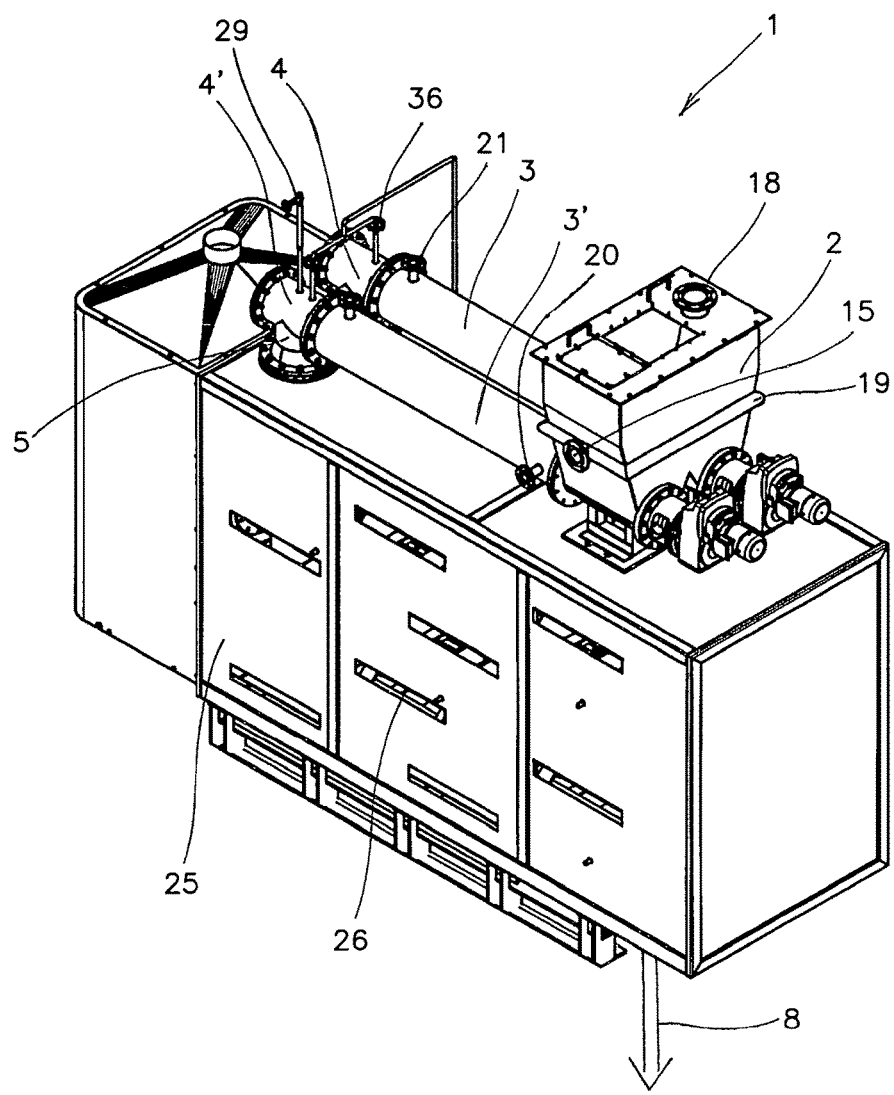
FIG. 2 shows a perspective overall view of the device

As is seen from FIG. 2, the device 1 has a cabinet 25 in which three gasification bodies 7, 7', 7" are stored. The cabinet 25 has, on its sides, a set of service openings 26 for exchanging the heating elements 24 of the electrical heaters 14 arranged between the individual gasification bodies 7, 7', 7". Above the cabinet 25 is a filling chamber 2 into which the biomass (not shown) falls into the hopper (not shown). The filling chamber 2 has a cubical shape, the bottom of which is conical. On the side of the filling chamber 2 is a neck 15 for the supply of exhaust gas 16. In the upper lid 30 of the filling chamber 2 is an opening for the supply of biomass and a neck 18 for releasing exhaust gases 16 from the filling chamber 2. Exhaust gases 16 are continuously supplied from the internal combustion engine 17 into the filling chamber 2, pass through the biomass in the filling chamber 2 and exit through the neck 18 and a chimney (not shown) into the atmosphere. From the bottom part of the filling chamber 2 there project two supply augers 3, 3' that transport the biomass from the filling chamber 2 further into the reactor through the spacers 4, 4' connected to the outlet neck 5 with a flange.

Figure 3:
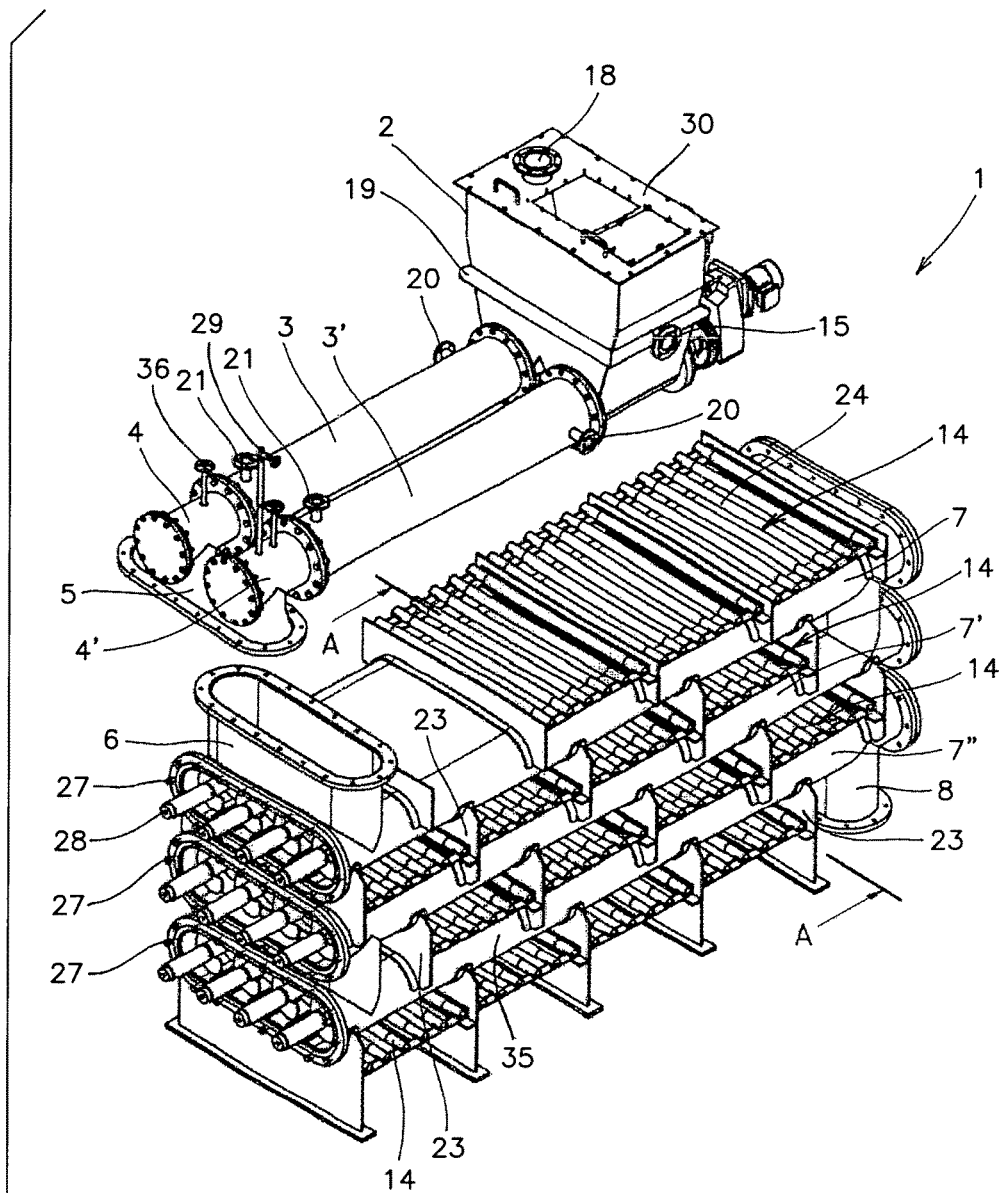
FIG. 3 shows an exploded perspective view of the assembly of the filling auger conveyors and gasification bodies with electrical heaters
Figure 4:
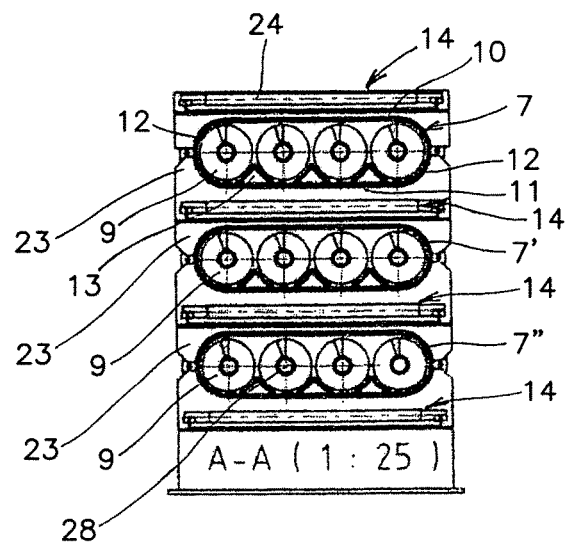
FIG. 4 shows a vertical sectional view of the device on the A-A plane of FIG. 3

FIG. 3 shows that the supply auger conveyors 3, 3' are each fitted with one neck 20 for supplying heat and one neck 21 for removing heat. The spacers 4, 4' then have necks 36 for supplying water or steam and in addition are fitted internally with a sensor 29 for the moisture of the material. FIG. 3 also shows the construction of the device 1 inside the cabinet 25, where three gasification bodies 7, 7', 7" are horizontally arranged above each other and are mutually interconnected so that the material passes through them in a serpentine direction. The upper gasification body 7 has an inlet neck 6 with a flange which is connected to the flange of the outlet neck 5, through which material falls out from the spacers 4, 4' into the uppermost positioned gasification body 7. The gasification bodies 7, 7', 7" form a floor supported by vertical bearing partitions 23 made of sheet metal. Each gasification body 7, 7', 7" is a sheet metal weldment of elliptical cross-section having a flat upper base 10, a flat lower base 11, and two semi-circular side walls 12. Inside each gasification body 7, 7', 7" are positioned, parallel to each other, four gasification augers 9, partially separated from each other by longitudinal partitions 13. The longitudinal partitions 13 are welded to the lower base 11 and are shaped like open semicircular half-grooves in which the gasification augers 9 are placed. The axles 28 of the gasifying augers 9 project from the front walls of the gasification bodies 7, 7', 7", where there are flanges 27 for connecting the drives (not shown) for the gasification augers 9. On the upper bases 10 of the gasifying bodies 7, 7', 7" are positioned electric heaters 14 comprised of sets of heating elements 24 in the form of tubes, the axes of which run perpendicular to the axles of the gasification augers 9. The heating elements 24 can thus be removed for replacement from the cabinet 25 through the service openings 26. Each electric heater 14 is bounded by longitudinal support partitions 23 and by side partitions 35 on the side, so it heats up the gasification body 7, 7', 7" arranged above it in an enclosed space.

Figure 5:
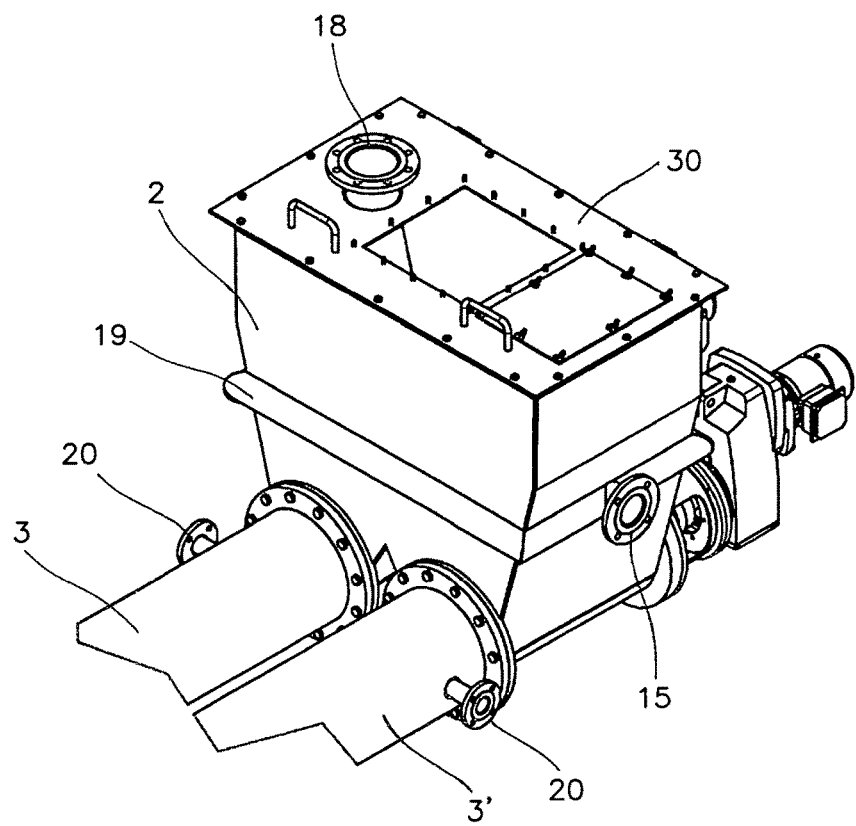
FIG. 5 shows a detailed perspective view of the filling chamber
Figure 6:
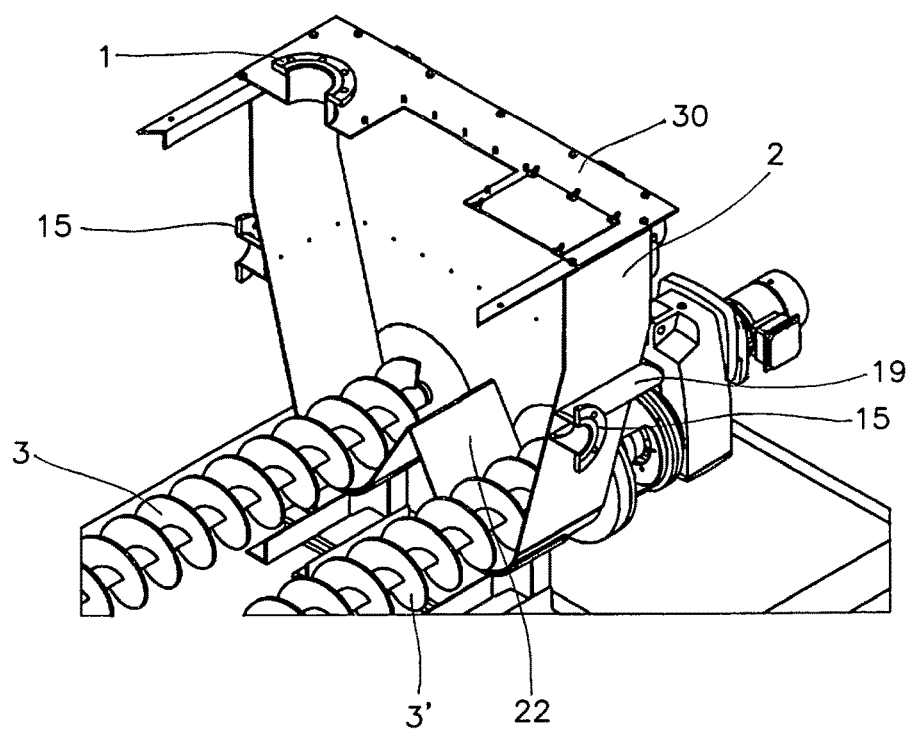
FIG. 6 shows a partial sectional view of the filling auger conveyors and filling chamber

FIGS. 5 and 6 show in detail the filling chamber 2. In its lower part is a wedge-shaped partition 22 that separates the supply auger conveyors 3, 3' from each other. On the sides are two necks 15 for the supply of exhaust gases 16 which are interconnected by distribution pipes 19 for uniform distribution of exhaust gases 16 into the filling chamber 2.

The device according to the invention can be used to produce fuel gas by the gasification of organic or inorganic material.

OVERVIEW OF THE POSITIONS USED IN THE DRAWINGS 1 device for the production of gaseous fuel
2 filling chamber
3 supply auger conveyor into the reactor
3' supply auger conveyor into the reactor
4 spacer
4' spacer
5 outlet neck with flange
6 inlet neck with flange
7 gasification body
7' gasification body
7" gasification body
8 outlet of synthesis gas
9 gasification auger
10 upper base of gasification body
11 lower base of gasification body
12 side wall of gasification body
13 longitudinal partition of gasification body
14 electric heater
15 neck for supply of exhaust gases
16 exhaust gases
17 internal combustion engine
18 neck for the removal/release of exhaust gases
19 distribution pipes for exhaust gases
20 neck for supply of heat
21 neck for removal/release of heat
22 wedge-shaped partition
23 support partition
24 heating element
25 cabinet
26 service opening for heating element replacement
27 connecting flange
28 axle of gasification auger
29 material humidity sensor
30 lid of filling chamber
31 gas cooling and cleaning unit
32 transformer
33 auxiliary media unit
34 torch
35 side partition
36 neck for water or steam inlet

The invention claimed is:

1. A device for the production of gaseous fuel from material of organic and/or inorganic origin, including a filling chamber which is connected to at least one supply auger conveyor for supplying material from the filling chamber into a reactor wherein the reactor comprises at least two horizontal rows above each other, wherein each row comprises at least two heated gasification augers, providing a serpentine passage of material from the filling chamber to an outlet of the fuel gas comprising synthesis gas generated by a thermochemical reaction in the gasification augers, wherein the outlet is arranged on the lowest positioned gasification auger, wherein each horizontal row of the gasification comprising a casing having upper base, a lower base and convex side walls each having a circular arc profile, wherein each gasifying body contains at least two gasification augers arranged side by side and mutually partially separated by longitudinal partitions which form half-grooves for the individual gasification augers, further, parallel to and outside the upper base and/or the lower base of each gasification body there is arranged at least one electrical heater; wherein, the filling chamber is hermetically sealed to prevent the inlet of atmospheric air during the filling of the material, and comprises at least one neck leading into the filling chamber for supplying exhaust gases from the combustion of the synthesis gas collected at the outlet of the device in an internal combustion engine, and the filling chamber is fitted with at least one neck for the release of exhaust gases from the filling chamber.

2. The device according to claim 1, wherein the filler auger conveyor is positioned above the uppermost positioned gasification body and is fitted with at least one neck for supplying water or steam to adjust the moisture of the material, with at least one neck for supplying heat, and at least one neck for releasing heat.

3. The device according to claim 2, wherein the filling chamber has a conical shape in its bottom part, and leading into the filling chamber are the ends of two supply auger conveyors, separated inside the filling chamber by a wedge-shaped partition, wherein towards the opposite ends of the filler auger conveyors there are connected spacers that lead into a common outlet neck with a flange which is connected to the flange of the inlet neck of the uppermost positioned gasification body.

4. The device according to claim 1, wherein between the filler auger conveyor and the uppermost positioned gasification body is a spacer containing a sensor for measuring the moisture of the material and a neck for supplying water or steam to adjust the moisture of the material.

5. The device according to claim 1, wherein it includes three gasification bodies positioned in horizontal rows one above the other, wherein in each gasification body there are arranged, in parallel in a horizontal plane, four gasification augers separated by longitudinal partitions.

6. The device according to claim 1, wherein the device includes a plurality of gasification body are separated from each other horizontally by vertical supporting partitions, wherein the electric heaters are removably positioned in the gaps between adjacent body and between the adjacent supporting partitions on the upper base of each gasification body, and are bounded by the side partitions.

7. The device according to claim 1, wherein the electric heater comprises a set of heating elements shaped like tubes, the axis of which run perpendicular to the axis of the gasification augers.

8. The device according to claim 1, wherein the device is housed in a cabinet with service openings for replacing the heating elements.

9. The device according to claim 1, wherein the filling chamber is fitted with two oppositely arranged necks for the supply of exhaust gas, wherein the necks are interconnected by distribution pipes, and a neck for releasing exhaust gases from the filling chamber is positioned above the necks.

10. The device according to claim 1, wherein the front wall of the gasification body is fitted with a common connecting flange for connecting a drive to the axis of the gasification augers.

* * * * *